(12) United States Patent
Maier et al.

(10) Patent No.: US 6,267,192 B1
(45) Date of Patent: Jul. 31, 2001

(54) REVERSING SYSTEM FOR A MOTORCYCLE

(75) Inventors: Josef Maier, Erdweg; August Schaeffler, Allershausen; Mike Hubertz, Munich, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/360,992

(22) Filed: Jul. 27, 1999

(30) Foreign Application Priority Data

Aug. 17, 1998 (DE) .............................................. 198 37 121

(51) Int. Cl.⁷ .................................................. B60K 1/00
(52) U.S. Cl. ........................................... 180/219; 180/65.2
(58) Field of Search ..................................... 180/219, 220, 180/221, 65.2, 69.6

(56) References Cited

U.S. PATENT DOCUMENTS

| | | |
|---|---|---|
| 4,827,148 | 5/1989 | Hirosawa et al. . |
| 4,869,332 | 9/1989 | Fujita et al. . |
| 4,870,874 | 10/1989 | Ito . |
| 4,923,028 | 5/1990 | Yamashita et al. . |
| 5,069,403 | * 12/1991 | Mann ................................... 180/221 |
| 6,076,416 | * 6/2000 | Sputhe ................................. 74/342 |

FOREIGN PATENT DOCUMENTS 3636286    4/1987   (DE) .

OTHER PUBLICATIONS

Witt, Peter, Motorräder 2, bearbeitete, Aufl. Berlin: Verlag Technik, 1991, pp. 117, 118.

* cited by examiner

Primary Examiner—Kevin Hurley
(74) Attorney, Agent, or Firm—Crowell & Moring, L.L.P.

(57) ABSTRACT

A motorcycle is described which has a driving device including an internal-combustion engine and a transmission which is driven by the engine and has several shifting positions. A starting device for the internal-combustion engine includes an electric motor as the starter motor, and a power transmission arrangement which transmits the driving force to a rear wheel. A reversing system uses the electric motor as the driving motor which drives the power transmission arrangement for the reversing. A selecting device at the motorcycle can be manually operated by a driver by way of an operating element, which selecting device connects either the driving device or the reversing system with the power transmission arrangement, the operating element being mounted on a housing for the transmission.

13 Claims, 2 Drawing Sheets

REVERSING SYSTEM FOR A MOTORCYCLE

BACKGROUND AND SUMMARY OF THE INVENTION

This application claims the priority of German application 198 37 121.7, filed in Germany on Aug. 17, 1998, the disclosure of which is expressly incorporated by reference herein.

The invention relates to a motorcycle having a reversing system operable to utilize an electric starter motor for reverse driving of the motorcycle.

U.S. Patent Document U.S. Pat. No. 4,827,148 describes such a motorcycle, in the case of which the operating element for engaging the reversing drive—a hand lever—is connected by means of a cable control system with a selecting device for a reversing system. The selecting device for the reversing system connects either the driving device or the reversing system with the power transmission arrangement of the motorcycle.

In this case, the driving device consists at least of an internal-combustion engine and of a transmission which is driven by the latter and has several shifting positions for forward driving. The reversing system uses an electric motor as the driving motor which drives the power transmission arrangement for the reversing. The same electric motor is also used as a starter motor of a starting device for the internal-combustion engine. The power transmission arrangement transmits the driving power from the transmission to a rear wheel.

Desmodromic cable controls for connecting a hand lever with a selecting device for engaging the reverse gear are very expensive. A large size is required and play is necessary in the Bowden cables. Further, a precise laying of the Bowden cables is necessary, which Bowden cables may also be affected by corrosion. The mounting of the Bowden cables at the conveyer line is unreliable and they may lengthen in the operation corresponding to the temperature.

It is therefore an object of the invention to provide a selecting device for a reversing system which can be produced at reasonable cost and, while its tolerance compensation is good and its weight is low, also permits a mounting at the motorcycle drive train which leads to no problems. In addition, high operating forces must be possible.

This object is achieved according to the invention by providing a motorcycle comprising a driving device including an internal-combustion engine, a transmission which is driven by the internal combustion engine and has several shifting positions, a starting device for the internal-combustion engine, including an electric motor as a starter motor, a power transmission arrangement which transmits the driving power from the transmission to the rear wheel, a reversing system which uses the electric motor as a driving motor which drives the power transmission arrangement for reversing, and a selecting device which by way of an operating element at the motorcycle can be manually operated by a driver, which selecting device connects either the internal combustion engine or the reversing system with the power transmission arrangement, wherein the operating element is mounted on a housing for the transmission.

According to the invention, the operating element of the selecting device, which is constructed as a hand lever, is mounted directly on a housing for the transmission. This has the advantage that no cable control systems are required in the direction of the hand lever.

In an advantageous embodiment of the invention, the operating element is mounted at the end of a shaft of the selecting device rotatably disposed in the housing of the transmission. A shaft can easily be led out of the housing of the transmission, in which case it is possible to seal off the rotatable bearing in a reliable manner.

In other preferred embodiments of the invention, the operating element is advantageously mounted at the end of an operating shaft which is rotatably disposed in a holding block which is fixedly connected with the housing of the transmission. In addition, the operating shaft can be removed from the shaft of the selecting device and is non-rotatably connected with the shaft of the selecting device outside the housing of the transmission. As the result of this arrangement, the operating element can advantageously be placed at a desired distance from the housing of the transmission. The operating shaft can, for example, also be led through a motorcycle covering, which simplifies the operation of the operating element.

In preferred embodiments of the invention, the operating shaft and the shaft of the selecting device are connected with one another by way of at least one rubber element. This advantageously increases the tolerance insensitivity of the plugtype connection and dampens the transmission of vibrations.

Other objects, advantages and novel features of the present invention will become apparent from the following detailed description of the invention when considered in conjunction with the accompanying drawings.

DETAILED DESCRIPTION OF THE DRAWINGS

Figure 1:
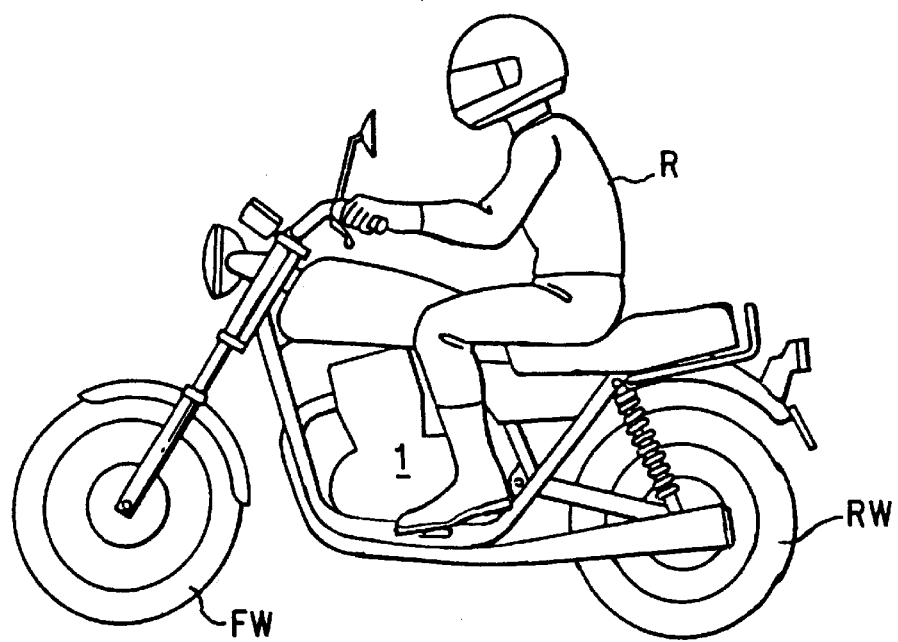
FIG. 1 is a schematic side view of a motorcycle with a reversing system constructed according to preferred embodiments of the invention.

FIG. 1 schematically depicts a motorcycle M with a rider R, front wheel FW and rear wheel RW. The rear wheel RW is driven by way of an internal combustion engine and a transmission. In FIG. 1 a housing 1 for a transmission is schematically depicted, which housing is described in more detail in conjunction with FIGS. 2 and 3.

Figure 2:
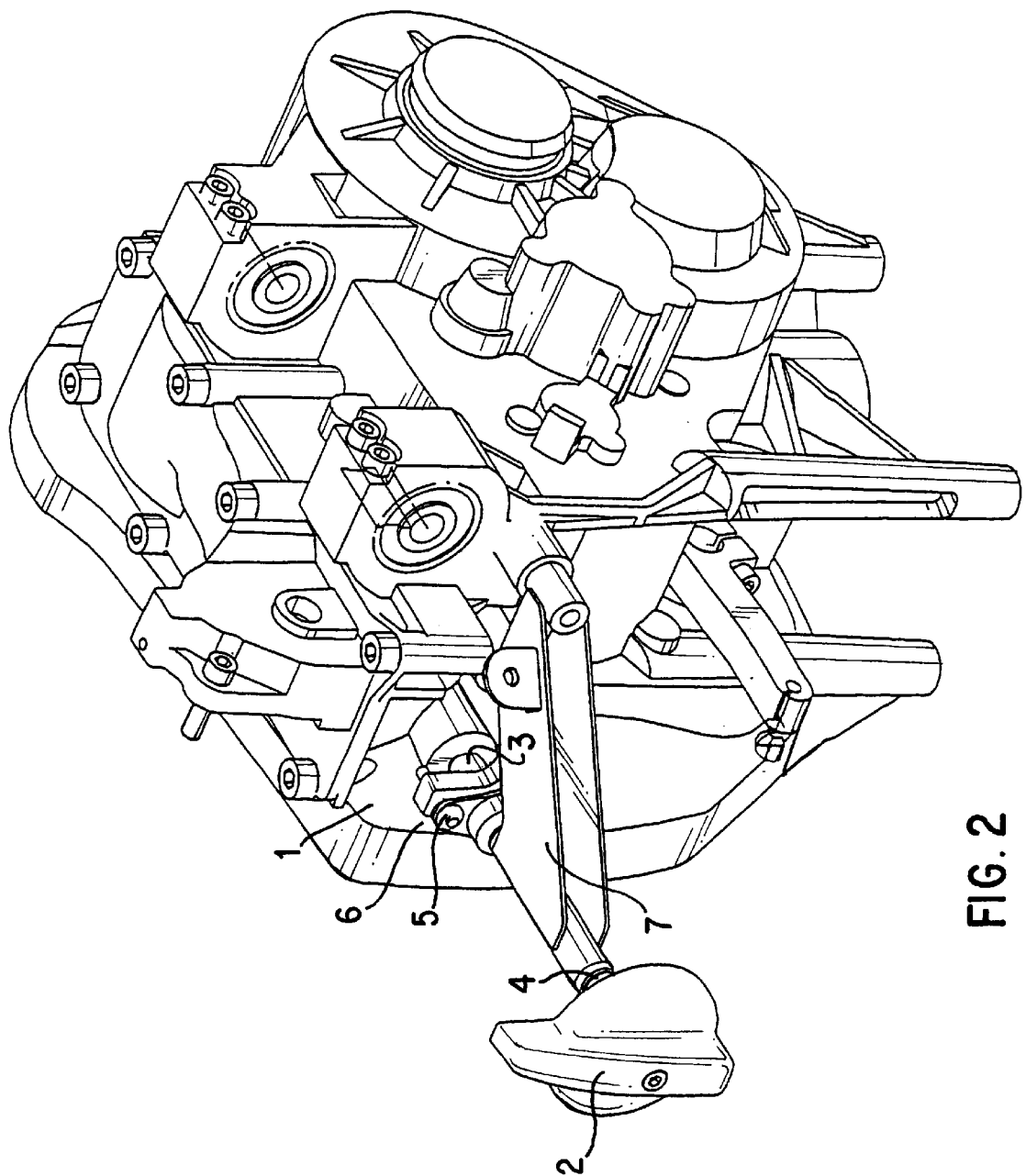
FIG. 2 is a perspective view of a housing of a motorcycle transmission for use with a motorcycle such as in FIG. 1, with a selecting device for a reversing system, constructed according to a preferred embodiment of the invention.

According to FIG. 2, an operating element, which is constructed as a hand lever 2, is mounted on a housing 1 for a transmission of a motorcycle which is not shown and has a driving device at least consisting of an internal-combustion engine and the transmission with several the shifting positions for forward driven by this internal-combustion engine. The hand lever 2 has the purpose of manually controlling, by the operation by a driver, a selecting device on the motorcycle, which selecting device connects either the driving device or a reversing system with a power transmission arrangement. The power transmission arrangement transmits the driving force from the internal combustion engine and transmission to a rear wheel. The reversing system uses an electric motor as the driving motor which drives the power transmission arrangement for the reversing and, in the normal operation, is used as a starter motor for the internal-combustion engine.

Figure 3:
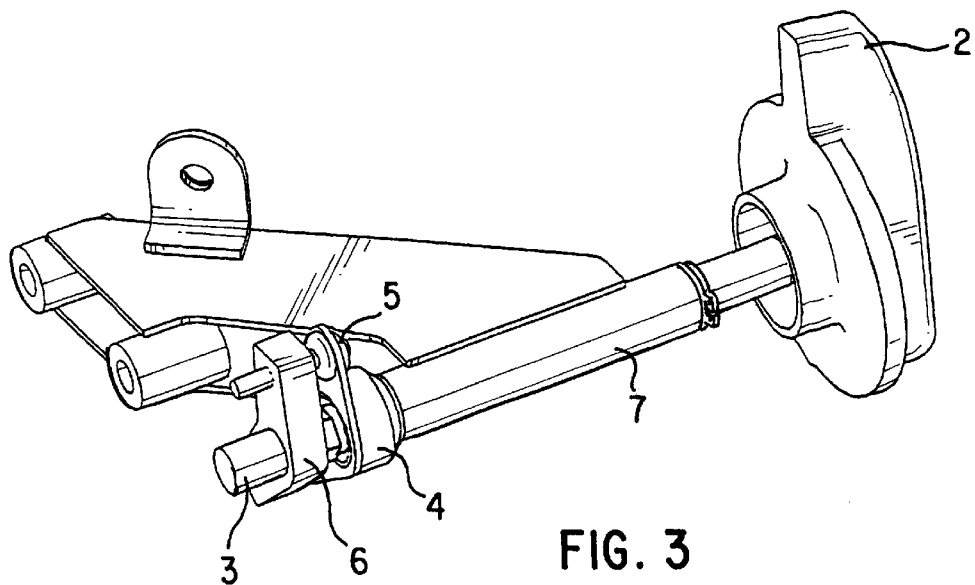
FIG. 3 is an enlarged view of the selecting device for the reversing system of FIG. 1, taken from a different projected direction.

A shaft 3 of the selecting device, which is rotatably disposed in the housing 1 of the transmission, as illustrated in FIGS. 2 and 3, is led out of the housing 1 and is non-rotatably connected with an operating shaft 4 by way of a rubber element 5. For the torque transmission, the shaft 3 and the operating shaft 4 are connected with one another by an eccentric plug-type connection 6.

The hand lever 2 is fixedly mounted at the other end of the operating shaft 4, which operating shaft is rotatably disposed in a holding block 7 which, in turn, is fixedly connected with the housing 1 of the transmission by screws which are not shown.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motorcycle comprising:
   a driving device including an internal-combustion engine,
   a transmission which is driven by the internal combustion engine and has several shifting positions,
   a starting device for the internal-combustion engine, including an electric motor as a starter motor,
   a power transmission arrangement which transmits the driving power from the transmission to the rear wheel,
   a reversing system which uses the electric motor as a driving motor which drives the power transmission arrangement for reversing, and
   a selecting device which by way of an operating element at the motorcycle can be manually operated by a driver, which selecting device includes a shaft and is operable to connect either the internal combustion engine or the reversing system with the power transmission arrangement,
   wherein the operating element is mounted on a housing for the transmission,
   wherein the operating element is mounted at an end of an operating shaft, and
   wherein the operating shaft, being removable from the shaft of the selecting device, is non-rotatably connected with the shaft of the selecting device outside the housing of the transmission.

2. Motorcycle according to claim 1, wherein the shaft of the selecting device is rotatably disposed in the housing of the transmission.

3. Motorcycle according to claim 1, wherein the operating element is mounted at an end of the operating shaft, which operating shaft is rotatably disposed in a holding block which is fixedly connected with the housing of the transmission.

4. Motorcycle according to claim 3, wherein the operating shaft and the shaft of the selecting device are connected with one another by way of at least one rubber element.

5. A manually operable selecting device for switching a motorcycle transmission housed in a transmission housing between a forward drive by way of an internal combustion driving engine and a reverse drive by way of an electrical engine starter motor, said selecting device including a manually engageable operating element which in use is mounted on the transmission housing,
   wherein the operating element is mounted at an end of an operating shaft, and
   wherein the operating shaft, being removable from the shaft of the selecting device, is non-rotatably connected with the shaft of the selecting device outside the housing of the transmission.

6. A selecting device according to claim 5, wherein the shaft of the selecting device is rotatably disposed on the transmission housing, and wherein the operating element is mounted at an end of the shaft of the selecting device.

7. A selecting device according to claim 6, wherein the operating shaft is interposed between the transmission housing and the shaft of the selecting device, said operating shaft being rotatably disposed in a holding block which is fixedly connected with the transmission housing.

8. A selecting device according to claim 7, wherein the first and second shafts are connected with one another by way of at least one rubber element.

9. A selecting device according to claim 5, wherein said operating element is connected to switch the motorcycle between said forward drive and reverse drive without any flexible cable connection.

10. Motorcycle comprising:
    a driving device including an internal-combustion engine,
    a transmission which is driven by the internal combustion engine and has several shifting positions,
    a starting device for the internal-combustion engine, including an electric motor as a starter motor,
    a power transmission arrangement which transmits the driving power from the transmission to the rear wheel,
    a reversing system which uses the electric motor as a driving motor which drives the power transmission arrangement for reversing,
    a selecting device which by way of an operating element at the motorcycle can be manually operated by a driver, which selecting device connects either the internal combustion engine or the reversing system with the power transmission arrangement,
    wherein the operating element is mounted on a housing for the transmission,
    wherein the operating element is mounted at an end of an operating shaft, which operating shaft is rotatably disposed in a holding block which is fixedly connected with the housing of the transmission, and
    wherein the operating shaft, being removable from the shaft of the selecting device, is non-rotatably connected with the shaft of the selecting device outside the housing of the transmission.

11. Motorcycle according to claim 10, wherein the operating shaft and the shaft of the selecting device are connected with one another by way of at least one rubber element.

12. A manually operable selecting device for switching a motorcycle transmission housed in a transmission housing between a forward drive by way of an internal combustion driving engine and a reverse drive by way of an electrical engine starter motor, said selecting device including a manually engageable operating element which in use is mounted on the transmission housing, a selecting device comprising a first shaft rotatably disposed on the transmission housing, wherein the operating element is mounted at an end of the first shaft, and wherein a second shaft is interposed between the transmission housing and the first shaft, said second shaft being rotatably disposed in a holding block which is fixedly connected with the transmission housing, said manually engageable operating element being mounted on the second shaft, said second shaft being selectively removable from the first shaft and being operable to be non-rotatably connected with the first shaft at a position outside the transmission housing.

13. A selecting device according to claim 12, wherein the first and second shafts are connected with one another by way of at least one rubber element.

* * * * *